(12) United States Patent
Roy et al.

(10) Patent No.: US 10,776,412 B2
(45) Date of Patent: Sep. 15, 2020

(54) DYNAMIC MODIFICATION OF INFORMATION PRESENTATION AND LINKAGE BASED ON USAGE PATTERNS AND SENTIMENTS

(71) Applicant: EMC IP Holding Company LLC, Hopkinton, MA (US)

(72) Inventors: Mainak Roy, Bangalore (IN); Chitrak Gupta, Bangalore (IN); Rathi Babu, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 9 days.

(21) Appl. No.: 16/032,358

(22) Filed: Jul. 11, 2018

(65) Prior Publication Data

US 2020/0019643 A1    Jan. 16, 2020

(51) Int. Cl.
| | |
|---|---|
| *G06F 17/00* | (2019.01) |
| *G06F 16/34* | (2019.01) |
| *G06N 20/00* | (2019.01) |
| *G06F 16/338* | (2019.01) |
| *G06F 40/30* | (2020.01) |

(52) U.S. Cl.
CPC .......... *G06F 16/345* (2019.01); *G06F 16/338* (2019.01); *G06F 40/30* (2020.01); *G06N 20/00* (2019.01)

(58) Field of Classification Search
CPC .. G06F 16/9535; G06F 16/345; G06F 16/338; G06F 17/2785; G06F 40/30; G06N 20/00
USPC ........................................................ 715/254
See application file for complete search history.

(56) References Cited

U.S. PATENT DOCUMENTS

| | | | |
|---|---|---|---|
| 5,920,864 A | 7/1999 | Zhao | |
| 2004/0083463 A1* | 4/2004 | Hawley | G06F 9/451 717/140 |
| 2006/0048042 A1* | 3/2006 | Sembower | G06F 16/9535 715/255 |

(Continued)

OTHER PUBLICATIONS

Apache OpenNLP, "Welcome to Apache OpenNLP," https://opennlp.apache.org/, 2017, 2 pages.

(Continued)

*Primary Examiner* — Jason T Edwards
(74) *Attorney, Agent, or Firm* — Ryan, Mason & Lewis, LLP

(57) ABSTRACT

A method comprises defining a machine learning model corresponding to a plurality of layouts for content based on a plurality of target user types, processing the content to identify a theme of the content, generating at least one electronic document for the content based on the theme and at least one of the plurality layouts, analyzing a plurality of interactions of a user with the electronic document, wherein the plurality of interactions include one or more searches performed by the user to retrieve the electronic document, and/or one or more steps taken by the user to consume the content in the electronic document, identifying at least one pattern of the user corresponding to the retrieval and/or consumption of the content, and training the machine learning model based on the at least one pattern by applying one or more machine learning algorithms to data from the plurality of interactions.

20 Claims, 9 Drawing Sheets

(56) References Cited

U.S. PATENT DOCUMENTS

| | | | | |
|---|---|---|---|---|
| 2011/0029464 | A1* | 2/2011 | Zhang | G06N 20/00 |
| | | | | 706/12 |
| 2012/0096087 | A1* | 4/2012 | Curcelli | G06Q 10/101 |
| | | | | 709/204 |
| 2016/0019464 | A1* | 1/2016 | Madhavan | G06F 16/972 |
| | | | | 706/11 |
| 2016/0063016 | A1* | 3/2016 | Eggleston | G06F 16/951 |
| | | | | 707/706 |
| 2017/0099358 | A1* | 4/2017 | Perez | G06Q 10/0639 |
| 2017/0230470 | A1* | 8/2017 | Ravishankar | G06F 9/451 |
| 2018/0011860 | A1* | 1/2018 | Barhate | G06F 16/41 |
| 2018/0084002 | A1* | 3/2018 | Shnitzer | H04L 63/1416 |
| 2018/0129634 | A1* | 5/2018 | Sivaji | G06F 16/345 |
| 2018/0144054 | A1* | 5/2018 | Ramanathan | G06F 17/2745 |
| 2018/0196784 | A1* | 7/2018 | Kumar | G06F 17/248 |
| 2019/0034498 | A1* | 1/2019 | Das | G06N 3/08 |

OTHER PUBLICATIONS

Fileinfo.com, "CONFIG File Extension—What is a .config File and how do I Open it?" https://fileinfo.com/extension/config, Aug. 24, 2016, 2 pages.

OpenNLP, "OpenNLP Tools Models—Models for 1.5 Series," http://opennlp.sourceforge.net/models-1.5/, downloaded Jul. 5, 2018, 3 pages.

Wikipedia, "Training, Test and Validation Sets," https://en.wikipedia.org/wiki/Training,_test,_and_validation_sets, Mar. 22, 2018, 4 pages.

* cited by examiner

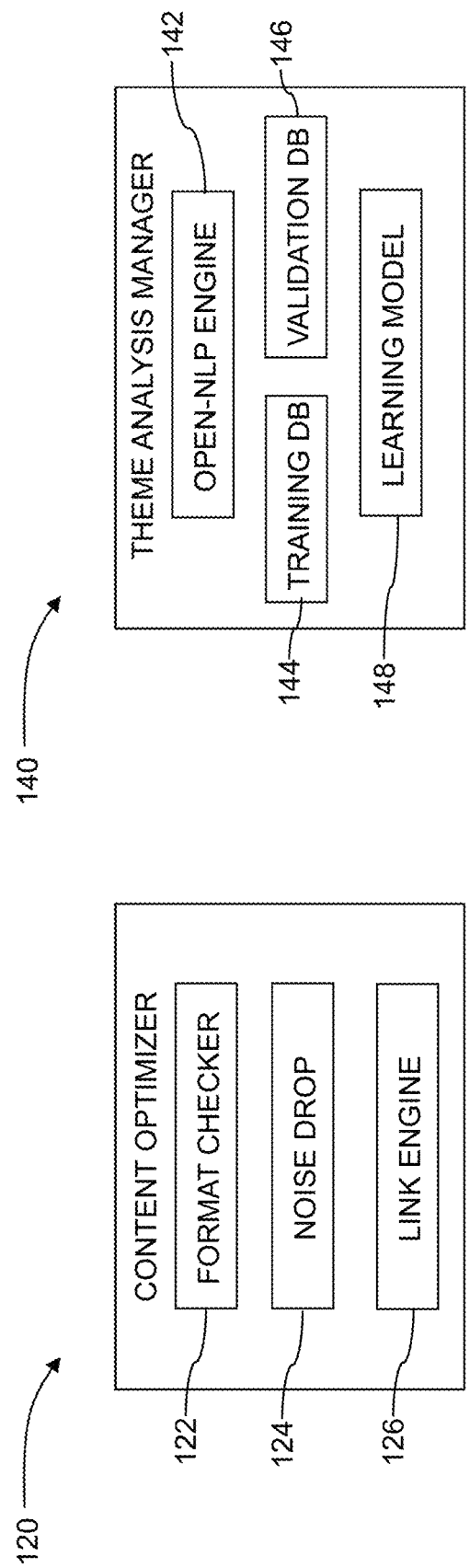

DYNAMIC MODIFICATION OF INFORMATION PRESENTATION AND LINKAGE BASED ON USAGE PATTERNS AND SENTIMENTS

FIELD

The field relates generally to information processing systems, and more particularly to a dynamic information understanding system configured for dynamically modifying the presentation of information based on user behavioral patterns.

BACKGROUND

Content is abundant, and is present in different documentation sets. However, when users attempt to search for and retrieve the content or information related to the content, using, for example, internal and external search engines, the desired content may not necessarily appear in the search results.

In general, the same information can be consumed differently by different users, and the sentiments about the information can vary from user to user. For example, the way data center administrators will consume and search for information may be significantly different from the way a chief experience officer (CXO) will consume and search for the information.

Accordingly, there is a need for improved information processing systems that can take into account different audiences for content and modify the presentation of the content so that availability and relevance of the content increases for users accessing the content.

SUMMARY

In one embodiment, an apparatus comprises at least one processing platform including a plurality of processing devices. The processing platform is configured to define a machine learning model corresponding to a plurality of layouts for content based on a plurality of target user types, process the content to identify a theme of the content, generate at least one electronic document for the content based on the theme of the content and at least one of the plurality of layouts for the content, analyze a plurality of interactions of at least one user with the electronic document, wherein the plurality of interactions include at least one of one or more searches performed by the at least one user to retrieve the electronic document, and one or more steps taken by the at least one user to consume the content in the electronic document, identify at least one pattern of the at least one user corresponding to at least one of the retrieval and the consumption of the content based on the analyzing, and train the machine learning model based on the at least one pattern by applying one or more machine learning algorithms to data from the plurality of interactions.

These and other illustrative embodiments include, without limitation, apparatus, systems, methods and computer program products comprising processor-readable storage media.

BRIEF DESCRIPTION OF THE DRAWINGS

FIG. 2 is a block diagram of a content optimizer in an illustrative embodiment.

FIG. 3 is a block diagram of a theme analysis manager in an illustrative embodiment.

DETAILED DESCRIPTION

Figure 1:
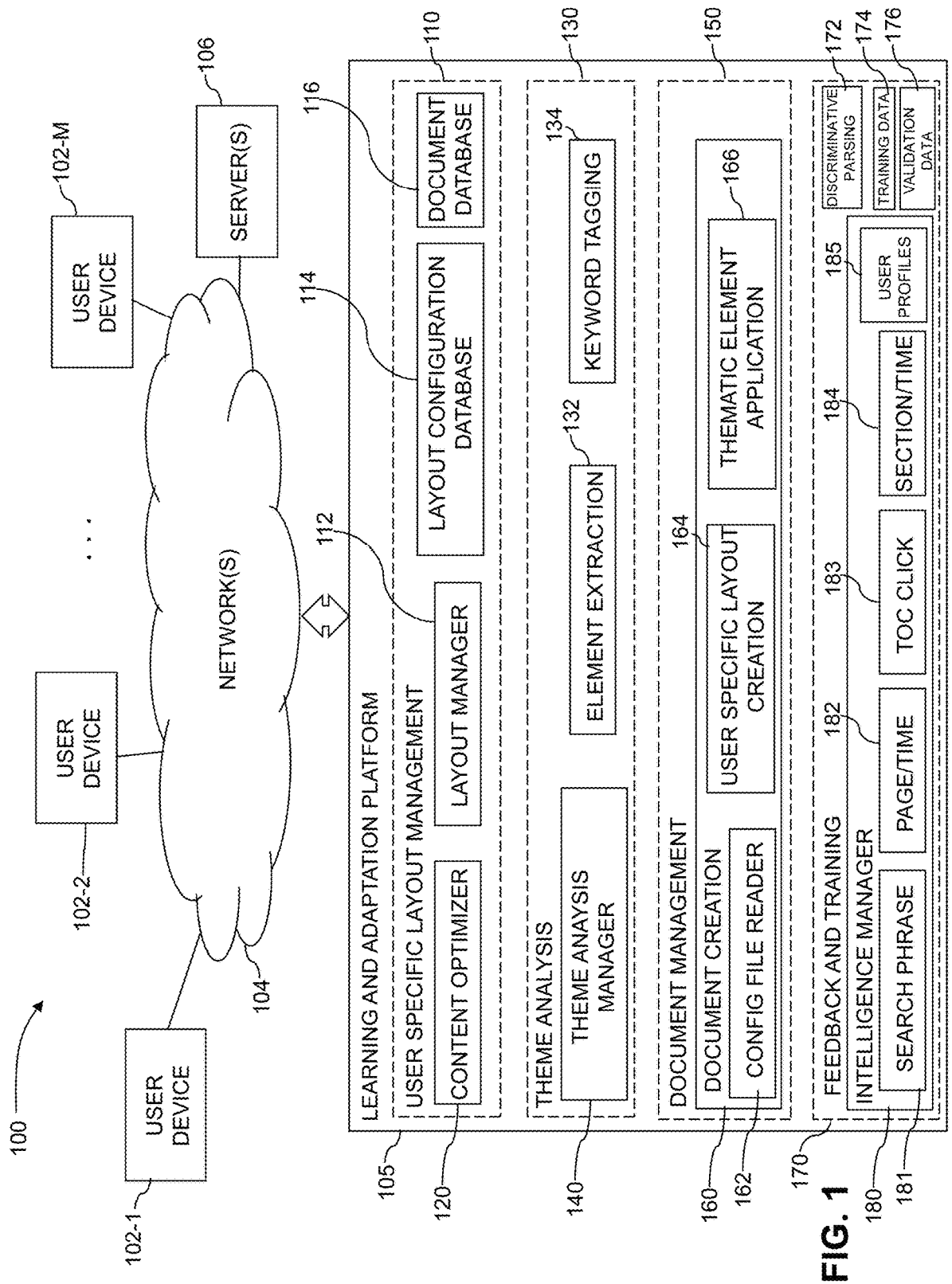
FIG. 1 is a block diagram of an information processing system comprising a learning and adaptation platform configured for dynamically modifying the presentation of information based on user behavioral patterns in an illustrative embodiment.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Examples of public clouds may include, but are not limited to, Amazon Web Services® (AWS), Google Compute Engine® (GCE), and Microsoft Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment of the invention is implemented, other appropriate timescales that provide at least contemporaneous performance and output can be achieved.

As used herein, "content" refers to the text associated with any concept, reference or a particular task that is focused on a specific component or targeting a specific task. In a non-limiting illustrative example, content includes the information that can be covered in a single .xml/.html file.

As used herein, "document layout" or "doc layout" refers to data flow in a focused way that can be consumed thematically by a specific set of users. Document layout is driven by multiple .xml or .html files and by a dynamic table of contents (TOC). In non-limiting illustrative examples, the embodiments of the present invention control document layouts of various electronic documents, including but not necessarily limited to, troubleshooting guides, installation guides, setup guides and other organizational documents.

As used herein, "information" refers to data which can be electronically accessed by users, including, but not necessarily limited to, data describing products, technology, services, and/or implementation and business aspects of products, technology and/or services. In non-limiting illustrative examples, the information can be part of documents and/or driven from blog posts, social media posts or discussions and/or whitepapers. Information further includes data corresponding to content and document layout from an owner of the information.

FIG. 1 shows an information processing system 100 configured in accordance with an illustrative embodiment. The information processing system 100 comprises user devices 102-1, 102-2, . . . 102-M (collectively "user devices 102). The user devices 102 communicate over a network 104 with a learning and adaptation platform 105.

The user devices 102 can comprise, for example, desktop, laptop or tablet computers, mobile telephones, or other types of processing devices capable of communicating with the learning and adaptation platform 105 over the network 104. The variable M and other similar index variables herein such as K, L, N and O are assumed to be arbitrary positive integers greater than or equal to two.

The term "user" herein is intended to be broadly construed so as to encompass numerous arrangements of human, hardware, software or firmware entities, as well as combinations of such entities. Learning and adaptation services are assumed to be provided for users utilizing one or more machine learning models, although it is to be appreciated that other types of infrastructure arrangements could be used. At least a portion of the available services and functionalities provided by the learning and adaptation platform 105 in some embodiments may be provided under Function-as-a-Service ("FaaS") and/or Platform-as-a-Service (PaaS) models, including cloud-based FaaS and PaaS environments.

The learning and adaptation platform 105 in the present embodiment is assumed to implement at least a portion of a machine learning environment accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The learning and adaptation platform 105, on behalf of respective infrastructure tenants each corresponding to one or more users associated with respective ones of the user devices 102, implements a dynamic information understanding system (IUS), which can use one or more machine learning models to understand different user behavioral patterns and convert the understanding into one or more training modules. According to an embodiment, the infrastructure tenants are cloud infrastructure tenants. By way of example, the learning and adaptation services are assumed to include execution and training of one or more machine learning applications on behalf of each of one or more users associated with respective user devices 102, wherein the machine learning applications to design dynamic document layouts for electronic documents to provide accurate information flow based on user profiles, and ensure better user (e.g. customer or organizational user) engagement and experience when using online tools. The learning and adaptation platform 105 implements the IUS, which uses artificial intelligence to control content using multi-layer protection, so that the same content driven information can be consumed by different sets of audiences based on their behavioral aspects. As used herein, "multi layer protection" refers to categorizing the common factors of different behavioral aspects and ensuring that content is mapped accordingly to each of those behavioral aspects. Hence, multi layer protection allows the different sets of audiences to receive the same kind of information/content even though their requirements are different from each other.

The learning and adaptation platform 105 in some embodiments may be implemented as part of a cloud infrastructure in the form of a cloud-based system such as an AWS system. Other examples of cloud-based systems that can be used to provide at least portions of the learning and adaptation platform 105 and possibly other portions of system 100 include GCE, and Microsoft Azure®.

In accordance with an embodiment of the present invention, the learning and adaptation platform 105 implements usage pattern learning and adaptation. Users (e.g., customers or organizational users/employees) may electronically search for, access and use information from an organization in a variety of ways. The behavior of respective users in connection with electronically searching for, accessing and using information is different and can vary based on, for example, individual preferences, devices being used, and/or reasons for needing the information. Assuming that the information is constant, the embodiments of the present invention recognize an "n×1" approach, where n=different ways that users are searching for, accessing and/or using information and 1=the information being sought, accessed and/or used. More specifically, in a non-limiting example, 1=information, at any given point in time, which is appearing as a search result against a specific key phase and/or keyword.

As n is not constant, the learning and adaptation platform 105 executes one or more algorithms that can learn and re-learn the users' behavior patterns over a period of time, while keeping the information constant. The learning and adaptation platform 105 continuously executes the one or more algorithms, which, for example, analyzes information consumed by users against a business driven logical structure and a product driven thematic structure (described further herein) in connection with searching for, accessing and/or using the information. The learning and adaptation platform 105 further analyzes the segmentation of each information set that is being consumed by one or more users.

In accordance with an embodiment of the present invention, the learning and adaptation platform 105 periodically generates a guidance model for existing content, and determines how the generated guidance model is performing based on a predefined guidance model (also referred to herein as a "secondary guidance model"). The learning and adaptation platform 105 further generates a predictive guidance model for future content for a new set of information corresponding to, for example, an upcoming product/service, and/or changes to an existing product/service.

The learning and adaptation platform 105 in the embodiment of FIG. 1 illustratively comprises a user specific layout management layer 110, a document theme analysis layer 130, a document management layer 150, and a feedback and training layer 170. The user specific layout management layer 110 creates sections and headings for electronic documents based on target user type. A first level TOC will be created based on a layout chosen by the user specific layout management layer 110. The user specific layout management layer 110 comprises a layout manager 112, a layout configuration database 114, a document database 116 and a content optimizer 120.

The layout configuration database 114 includes a plurality of document layout configurations for content based on a plurality of target user types and a nature of a document as it relates to the target users. The plurality of layout configurations include, but are not necessarily limited to, functional, instructional, theoretical, diagrams/figures, generic, or other document type. The layout manager 112 generates a plurality of respective layouts for content, which correspond to the different document types from the layout configuration database 114. For example, the layout manager 112 generates respective layouts for content based on each of a functional, instructional, theoretical, diagrams/figures, generic, or other document type. The document database 116 includes a plurality of documents already having a layout, which can serve as reference for the layout manager 112 when generating the plurality of respective document layouts corresponding to the different document types. For example, the layout manager 112 can base a document layout on an existing document layout for a document in the document database 116 having the same document type.

Referring to FIG. 2, the content optimizer 120 of the user specific layout management layer 110 comprises a format checker 122, a noise drop component 124 and a link engine 126. In general, the content optimizer 120 identifies different parameters including, but not necessarily limited to, key phrases used, languages in use, latest set of information, and/or any related document that refers another specific product from any online or offline electronic source file.

Using the format checker 122, noise drop component 124 and link engine 126, the content optimizer 120 addresses different parameters during digital data processing to ensure that the latest information is always accessible by any search engine, and is included in the document layouts generated by the layout manager 112.

While processing digital data, the format checker 122 examines a content set and identifies different types of source files and output files. The format checker 122 enables the system 100 to understand which input/output type is in use, decides or makes recommendations to deprecate and/or remove any unwanted or obsolete file formats which may not be in use, and confirms, based on an organizational (e.g., business) guidance model, if all the required file formats are available for a specific set of documents or information.

The noise drop component 124 removes noisy or redundant content, multiple usages of common terminologies/common steps and injected content, which may have been required to cover up some product limitation during an older product release. The noise drop component 124 is important for developing meaningful content and producing guides where information flow is flawless. The noise drop component 124 organizes information in a manner that can be consumed by multiple search algorithms.

The link engine 126 verifies whether a relationship is correct among different guides of different products/services and proposes or decides the topics/modules that can be cross-referenced via, for example, hyperlinks based on the information flow. The link engine 126 uses behavioral aspects of users, user types and a secondary guidance model to determine the links between the topics/modules that can be cross-referenced. The link engine 126 generates customized links across documents based on the organizational (e.g., business) guidance model and by adopting the thematic structure of a product/service. The link engine 126 ensures trusted links across multiple documents of the same information set (e.g., same product/service). In general, the link engine 126 provides for the generation of inbound and outbound signals from one source to other trusted sources among different content sources (or within the same documentation set), which results in a broader information foundation for an organization.

The document theme analysis layer 130 identifies a theme of content by analyzing different elements of the content. The document theme analysis layer 130 includes an element extraction engine 132, a keyword tagging component 134 and a theme analysis manager 140. The element extraction engine 132 extracts from the content one or more elements from which the theme can be identified. The one or more elements include, but are not necessarily limited to, an image, a table, a statement, a numeric combination, and/or an expressed sentiment. The keyword tagging component 134 identifies one or more keywords and/or key phrases in the content from which the theme can be identified.

Referring to FIG. 3, the theme analysis manager 140 of the document theme analysis layer 130 includes a natural language processing (NLP) engine 142, training and validation databases 144 and 146 and a learning model component 148. The NLP engine 142 is able to derive meaning from human or natural language in content, and process the natural language to determine a theme of the content. According to an embodiment of the present invention, the NLP engine 142 can include an open source NLP engine that supports NLP tasks, including, but not necessarily limited to, tokenization, sentence segmentation, part-of-speech tagging, entity extraction, chunking, parsing, language detection and coreference resolution.

The theme analysis manager 140 uses the machine learning model 148 to learn from and make predictions on themes of the content based on the extracted elements, keywords and/or key phrases. Some non-limiting examples of themes include "legal/financial", "hardware", "software", "security", "virtualization", and "storage." Themes are derived from products and line of business. The machine learning model 148 uses one or more machine learning algorithms to make data-driven predictions or decisions by building a mathematical model from the extracted elements, keywords and/or key phrases.

The data used to build the machine learning model 148 is derived from multiple datasets. For example, the model 148 is initially fit on a training dataset, which is stored in a training database 144, and includes a set of examples used to fit the parameters of the model 148. The model 148 is trained on the training dataset using, for example, a supervised learning method. The fitted model 148 is used to predict responses for observations in a second dataset called the validation dataset, which is stored in the validation database 146. The validation dataset provides an unbiased evaluation of the model 148 fit on the training dataset and tunes hyperparameters of the model 148.

The document management layer 150 generates electronic documents for content based on a theme of the content determined from the document theme analysis layer 130 and at least one of the plurality layouts for the content from the user specific layout management layer 110. The document management layer 150 includes a document creation engine 160, which includes a configuration file reader 162, a user specific layout creation component 164 and a thematic elements application component 166.

The configuration file reader 162 reads configuration information files associated with configuring the electronic document. The configuration files, for example, include plain text parameters that define settings or preferences for building or running a program. An example web configuration file may include XML configuration information that controls how a website works, from individual pages to an entire ASP.NET application.

The user specific layout creation component 164 creates one or more layouts for the electronic document corresponding to specific personas that may be consuming the content in the document. For example, different personas (e.g., a data center administrator, chief marketing officer, and technical support assistant) will consume a document differently, and need different portions of a document. Based on layouts from the user specific layout management layer 110 which are designed for the different personas, the user specific layout creation component 164 creates user specific layouts for the document which correspond to each persona, and are best suited for consumption by a user in that specific role.

The thematic elements application component 166 applies the thematic determinations with respect to a theme of the content from the document theme analysis layer 130, and further refines the document layout(s) based on the determined theme(s) of the content. Themes are business and product driven. Hence, themes can be leveraged for any upcoming product line from the same business unit. The combined processing of the user specific layout creation component 164 and the thematic elements application component 166 produces one or more electronic documents having layouts which account for target audience and content themes.

The feedback and training layer 170 analyzes a plurality of interactions of one or more users with an electronic document such as, for example, searches performed to retrieve the electronic document, and steps taken to consume the content in the electronic document. Based on the analyzing, the feedback and training layer 170 identifies user patterns corresponding to the retrieval and the consumption of the content, and trains a machine learning model based on the identified patterns by applying one or more machine learning algorithms to data from the plurality of interactions. The machine learning model corresponds to a plurality layouts for the content based on a plurality of target user types.

The feedback and training layer 170 includes an intelligence manager 180, which monitors different user interactions with electronic documents and includes, but is not is not necessarily limited to, search phrase, page/time, TOC click and section/time modules 181, 182, 183, and 184.

The search phrase module 181 monitors and records key phrases and/or key words that have been used by users in connection with seeking the content. For example, key phrases and/or key words may be used in a search engine by users seeking certain information. The search phrase module 181 automatically identifies key phrases and/or key words used by users to find the content, identifies the frequency with which the key words and/or phrases may be used, links the key words and/or phrases to corresponding search results, identifies different combinations of key words and/or phrases that may be used when seeking the same content, and monitors whether the used key words and/or phrases yield the sought after content and/or documents.

The TOC click module 183 monitors and records user clicks (e.g., activation of hyperlinks caused by, for example, mouse clicks, finger clicks on a touchscreen, typed-in URLs, etc.) in connection with a table of contents of an electronic document. The TOC click module 183 provides data corresponding to the effectiveness of a TOC in navigating a user to desired content, whether the TOC is relevant to a user's needs and highlights content which users might be looking for based on their personas or positions within an organization, and whether the descriptions in the TOC are accurate with respect to content being sought. The TOC click module 183 further monitors and records an electronic path a user follows in order to retrieve content from a document. For example, the path may include a TOC click followed by navigation in a web page, followed by an out-going link to the content. Knowledge and analysis of user paths to content can assist content owners (e.g., organizations) with understanding desired workflow from users' points of view.

The page/time and section/time modules 182 and 184 record and analyze the time users spend on pages and/or sections of a document, which can provide information on whether outgoing clicks lead to the sought after content. For example, spending less time on a portion of the document after a TOC click may indicate that the click led to unwanted, irrelevant or incorrect content.

The intelligence manager 180 further includes a user profiles component 185. The user profiles component 185 can record user profile information, including, but not necessarily limited to, log-in data, selections of roles, interests, and job titles, education information, etc. The user profiles component 185 can also be configured to mine data from external sources for user profile information, such as, for example, social media sources, employment databases, and websites mentioning the user. If there is no user profile information, a generic model can be assumed and user profile patterns for certain users can be trained based on data being accessed. The user profiles component 185 can store user profile information for future access when the user is seeking and consuming content. The user profiles component 185 may also be configured to provide an accounting of volume of traffic to different portions of an electronic document with respect to user profile/user type.

The feedback and training layer 170 further includes a discriminative parsing machine learning model 172, and associated training and validation databases 174 and 176 The feedback and training layer 170 uses the discriminative parsing machine learning model 172 to learn from and dynamically make changes to document presentation and layout based on identified usage patterns. In general, the model 172 uses one or more machine learning algorithms to make data-driven predictions or decisions regarding document presentation and layout and/or target user types by building a mathematical model from the data concerning the plurality of interactions of one or more users with an electronic document.

The data used to build the discriminative parsing machine learning model 172 is derived from multiple datasets. For example, the model 172 is initially fit on a training dataset, which is stored in a training database 174, and includes a set of examples used to fit the parameters of the model 172. The model 172 is trained on the training dataset using, for example, a supervised learning method. The fitted model 172 is used to predict responses for observations in a second dataset called the validation dataset, which is stored in the validation database 176. The validation dataset provides an unbiased evaluation of the model 172 fit on the training dataset and tunes hyperparameters of the model 172.

According to an embodiment of the present invention, based on output from the feedback and training layer 170, the learning and adaptation platform 105 continuously learns and adapts to the behavior patterns of different sets of users and designs a stack of key phrases and/or keywords which are being utilized further by the training data database 174 to produce accurate content for target users. Segmentation of data being consumed is used to create dynamic maps based on the usage patterns, where the keywords and/or key phrases are dynamically mapped to the content being consumed in the electronic document. Based on the training of the model 172, the presentation (e.g., layout and/or table of contents) of electronic documents are dynamically modified for better consumption by one or more target user types or personas. Further, based on training of the model 172 and identification of new usage patterns, new target user types can be defined, which may correspond to a new set of information for a new product/service line. New document layouts are also defined based on the newly defined target user types.

In accordance with an embodiment of the present invention, the output from the feedback and training layer 170 also includes, but is not necessarily limited to, different document guidelines, such as maps and TOCs for different target users, and reports regarding, for example, an output format of content, how content is expected to be consumed, and at what intervals content can be redesigned. The reports may automatically generated, may be based on target audience and/or document type, and can be transmitted to one or more user devices 102 over the network(s) 104.

The model 172 includes the periodically generated guidance model for existing content noted herein above, and is based, at least in part, on the data being consumed against the search key phrases and/or keywords. As noted herein above, the performance of the periodically generated guidance model is measured against a predefined (e.g., secondary) guidance model. For example, the secondary guidance model includes a pre-defined set of rules for different personas and a definite set of contents for the different personas. As a non-limiting illustrative example, three different personas include a datacenter adminstrator, a chief marketing officer, and a product vendor, who each require different document sets. Based on these personas, while the source of the content can be modified, the secondary guidance model includes pre-defined contents/headings for different TOCs based on the personas. In keeping with the above example, the different TOCs may be as follows: (1) Datacenter Administrator—Installing, Configuring, Deployment, Component Level Minutiae; (2) Chief Marketing Officer (business decision maker)—Price, License, Warranty, Support Service Level Agreement (SLA), Retrun on Investment (ROI); and (3) Vendor—What's New, Changes In Components/Cards/Hardware/PCIEs, Specification Documents.

Figure 4:
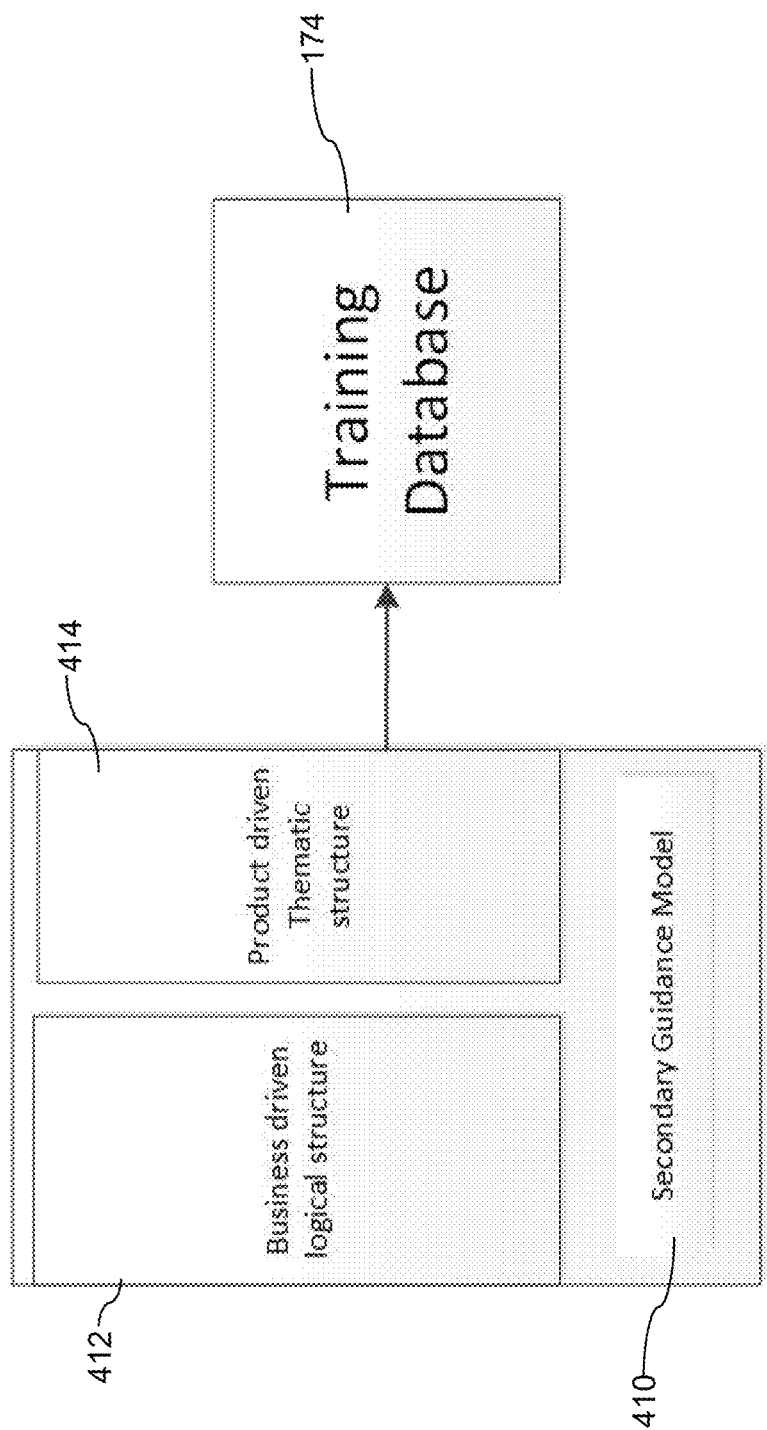
FIG. 4 is a block diagram of a system for enriching a training database with business and product driven information in an illustrative embodiment.

The model 172 also includes a predictive guidance model for future content for a new set of information for an upcoming/new product/service line. Referring to FIG. 4, enrichment and updating of the training database 174 with product driven information is explained, which is applicable in the case of upcoming/new product/service lines. As noted above, the learning and adaptation platform 105 continuously executes one or more algorithms that can learn and re-learn the users' behavior patterns over a period of time. More specifically, the learning and adaptation platform 105 analyzes information consumed by users against a business driven logical structure and a product driven thematic structure in connection with searching for, accessing and/or using the information. At block 412, the business driven logical structure of any information is identified. Business driven logical structures are helpful to design the information flow or the work flow of a product. For example, financial products will have a different information flow from the storage business unit. In a similar fashion, hardware documentation will have a different workflow than software documentation.

At block 414, referring back to the description of the document theme analysis layer 130 and the theme analysis manager 140 in FIGS. 1 and 3, the thematic structure of any information is identified by analyzing the workflows on that information. The differences between the business driven logical and thematic structures are identified in connection with high-level and low level components. For example, high-level components are critical for business and they can easily influence the decisions of the users who are consuming the information/content. Whereas, low-level components are usual/basic features, which are common across products from different generations. Then, the secondary guidance model 410 is analyzed to identify if any set of data is mandatory for any specific persona. There are certain business/legal aspects which are mandatory for certain product lines, and the information/content does not change among generations. This is important for legal documents that carry legal interpretations, financial records, terms and conditions.

Figure 5:
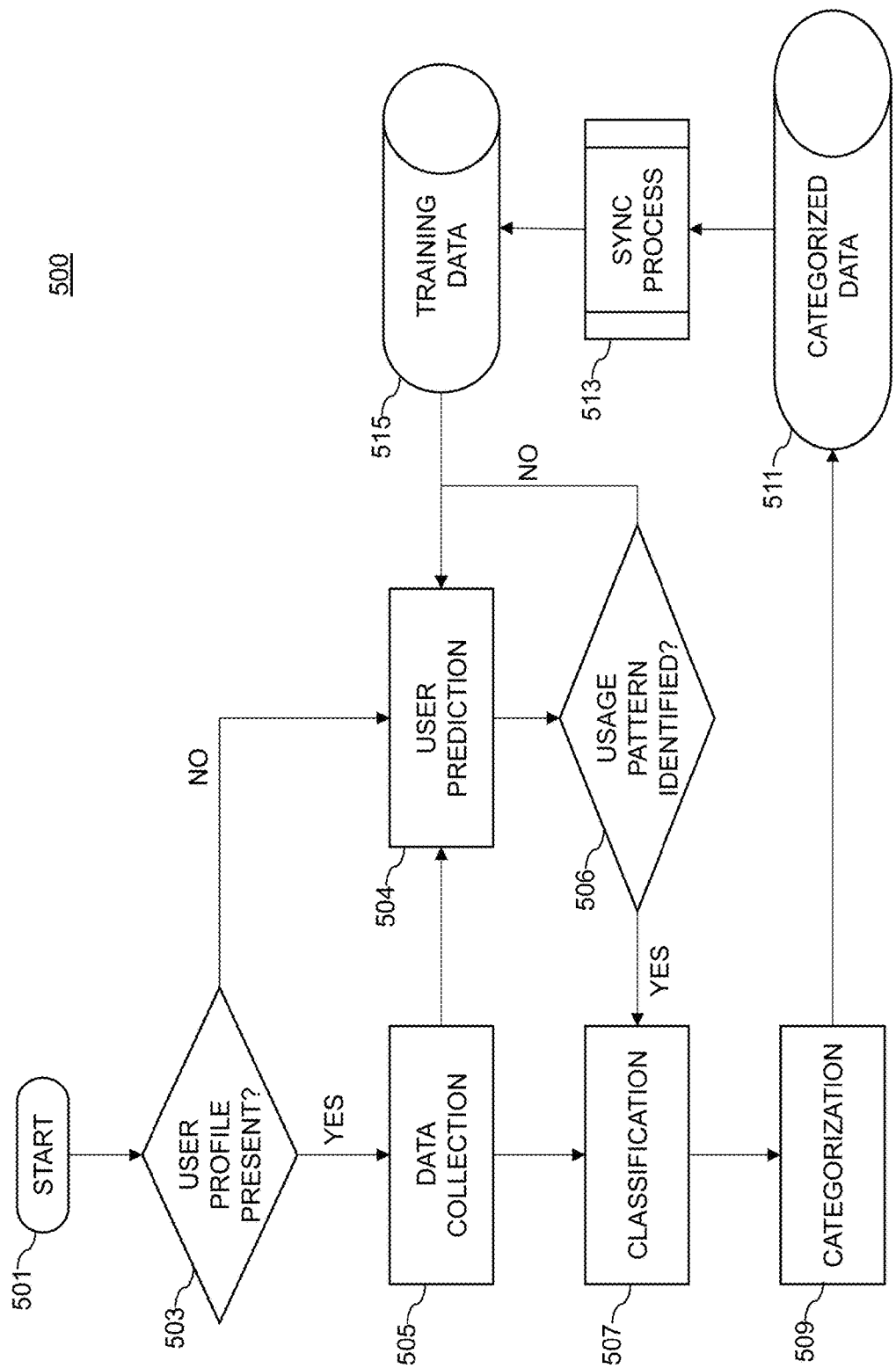
FIG. 5 is a flow diagram of a process for creating a behavioral data set in an illustrative embodiment.

Referring to FIG. 5, in steps to create a behavioral data set (steps 501, 503 and 505), the user behavioral pattern analysis can work with an existing user profile including information, such as, for example, log-in data, selections of roles, interests, and job titles, education information, etc., and then collect data on user interactions with the content. Alternatively, in connection with steps 503 and 504, in the absence of an existing user profile information, a generic model will be assumed and the profile pattern trained based on data being accessed. In connection with blocks 506, 507, 509, 511, 513 and 515 a behavioral analysis model will continually check the data being accessed and searched by a user until a usage pattern is identified. The data being accessed and searched by a user includes the TOCs, page indices and any link that leads to a complete model of the data access by a user. The data is classified (block 507) and categorized (block 509) based on language patterns stored in the training database 515. For example, in connection with the following questions posed by users in searches: (1) How do I configure virtual drives? (2) How do I create a Raid 5? (3) How many drives do I need for Raid 5? Cost? The categorization will use the training data from the training database 515 to map the questions to categories (categorization 509) which is stored in a categorized data database 511. In the example above, questions (1) and (2) would be attributed to, for example, an administrator or developer, and while question (3) may be attributed to, for example, a finance oriented role. A sync process (block 513) is performed between the categorized and training data.

Figure 6:
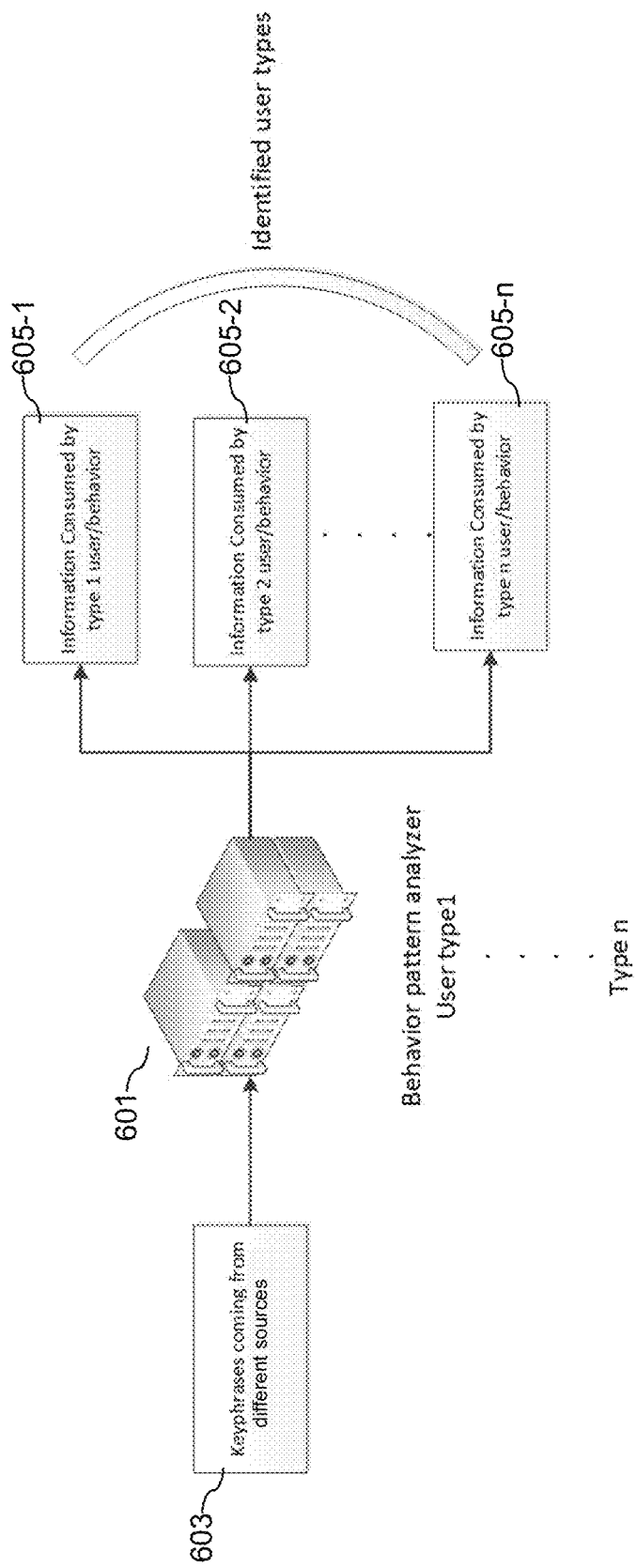
FIG. 6 is a block diagram of a learning system for user behavioral patterns to identify user types in an illustrative embodiment.
Figure 7:
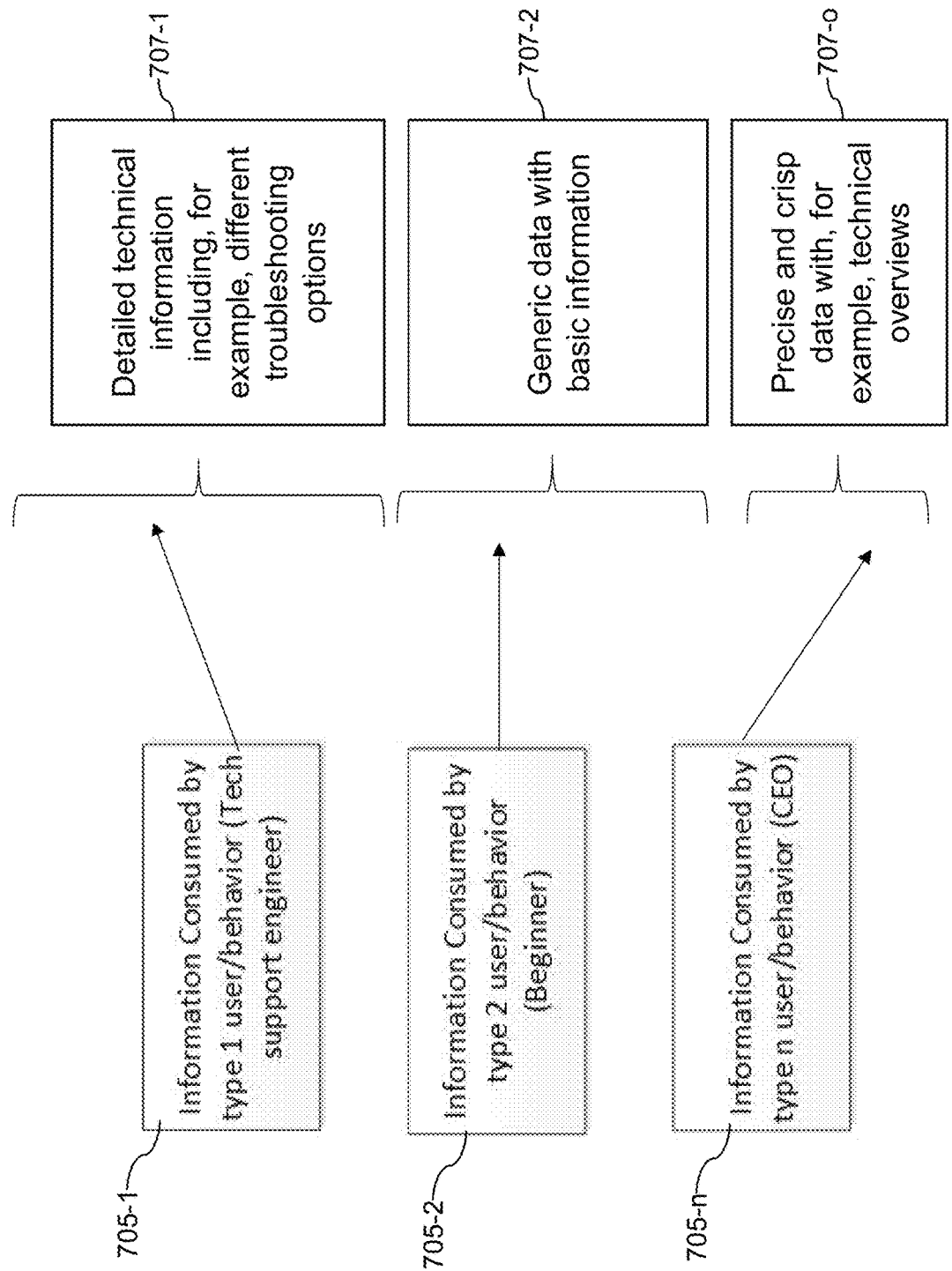
FIG. 7 is a block diagram correlating information consumed to user type in an illustrative embodiment.

Referring to FIG. 6, a block diagram of a learning system for user behavioral patterns to identify user types is shown. A behavior pattern analyzer 601, which can be, for example, the intelligence manager 180 or part of the intelligence manager 180 of the feedback and training layer 170, receives as inputs from different sources, keywords and/or key phrases 603 used by various users in connection different queries or searches. Using one or more machine learning models, the behavior pattern analyzer 601 identifies a plurality of user types 1, 2, . . . , n based on the different queries or searches. The behavior pattern analyzer 601 analyzes data on the consumption of content in connection with the different queries or searches and categorizes the consumed information 605-1, 605-2, . . . , 605-n according to user type 1, 2, . . . , n. For example, FIG. 7 is a block diagram correlating information consumed to user type. Referring to FIG. 7, consumed information 705-1, 705-2, . . . , 705-n respectively corresponds to information consumed by a technical support engineer, a beginner (entry level employee), and a chief executive officer. The information consumed by a technical support engineer includes, for example, detailed technical information including, for example, different troubleshooting options 707-1. The information consumed by a beginner (entry level employee) includes, for example, generic data with basic information 707-2. The information consumed by a CEO includes, for example, precise and crisp data with, for example, technical overviews 707-o. Embodiments of the present invention can dynamically generate or modify document TOCs to correspond to the information to be consumed by a particular user type 1, 2, . . . , n.

The learning and adaptation platform 105 can dynamically execute organization, presentation, reorganization and/or re-presentation of and design layouts for content in connection with the one or more documents based on learned behavioral patterns of a plurality of user types/personas. Such organization, presentation, reorganization, re-presentation and/or design can include, for example, adding one or more key words and/or key phrases used by target users in connection with seeking the content to one or more content headings, re-indexing the content, dynamically modifying TOCs associated with the document, and/or generating customized links across documents. Embodiments of the present invention provide for the organization, presentation, reorganization, re-presentation and/or layout design of the same content for multiple user types so that the information can be efficiently consumed by multiple audiences. In order to execute the organization, presentation, reorganization, re-presentation and/or layout design of the content, and perform monitoring user interaction with the content, the learning and adaptation platform 105 can communicate over the network(s) 104 with one or more servers 106 responsible for organizing the content and providing the content to the user devices 102.

According to an embodiment of the present invention, one or more machine learning algorithms discussed herein are based on not only key word mapping, but also based on key phrase mapping techniques which work in conjunction with search engines that search for content based on phrases (e.g., groupings of words) instead of individual words. According to an embodiment of the present invention, one or more machine learning algorithms discussed herein execute volumetric data grouping including capturing large amounts of data (e.g., terabytes and/or gigabytes of data).

The one or more machine learning algorithms discussed herein are configured to use data with consumable and differentiable architectures. For example, different businesses or enterprises have different deliverables and information strategies. Similar to using different formats and styles for the presentation of data, information design and generation methods are also different. The audience for the information can vary based on, for example, technological needs and demographics. The machine learning driven data, in accordance with an embodiment of the present invention, is consumable to accommodate distinct information design and generation methods based on, for example, different technological needs and demographics.

The one or more machine learning algorithms discussed herein are configured to repeatedly execute, to derive the users' behavior patterns, define document themes, and to execute the organization and presentation of content for electronic documents. The one or more machine learning algorithms discussed herein are further configured to identify information that is in demand and how that information is sought, accessed and/or consumed, and to capture meta data for any click.

In general, machine learning techniques and components used in accordance with embodiments of the present invention may include, but are not necessarily limited to, a Support Vector Machine (SVM), a Multilayer Perceptron (MLP), a deep learning model, decision trees, and clustering.

The user specific layout management layer 110, document theme analysis layer 130, document management layer 150 and/or feedback and training layer 170 comprise further hardware and software required for running the learning and adaptation platform 105, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

The databases discussed herein may comprise a database service, such as, but not necessarily limited to GCE Cloud Storage, Microsoft Azure Blob (Binary Large Object) Storage, DynamoDB, MongoDB, Amazon Aurora and Oracle database. The databases discussed herein may be populated with data from a plurality of sources including, but not necessarily limited to, a key phrase/key word dictionary and other monitoring data retrieved and/or analyzed in connection with the operation of the learning and adaptation platform 105. The key phrase/key word dictionary includes, for example, a repository of words and/or phrases determined to be often used and/or effective in connection with seeking content. For example, based on frequency of use (e.g. use exceeding a specified threshold) and/or use resulting in successfully retrieving desired content, the keyword tagging component 134 and the search phrase module 181 may identify key phrases and/or key words which are ultimately stored in the key phrase/key word dictionary The key phrase/key word dictionary may further include data identifying the frequency with which the key words and/or phrases are used, data identifying corresponding search results associated with the key words and/or phrases, data identifying different combinations of key words and/or phrases that may be used when seeking the same content, and data identifying whether the used key words and/or phrases yield the sought after content and/or documents.

Other monitoring/analytical data includes, for example, additional data such as, for example, extracted elements, click data, time spent on document portions and user profiles, which may be relied on when performing the one or more machine learning algorithms and/or determining customer behavior patterns, defining layouts and themes, and organizing, presenting re-organizing and/or re-presenting content.

The analysis and learning performed by the learning and adaptation platform can be performed based on real-time data from multiple sources retrieved over the network(s) 104, so that the information processing system can react to events as they happen. For example, the data may include user content interaction data captured in real-time, which may be relied on in performance of the one or more machine learning algorithms.

Although the user specific layout management layer 110, document theme analysis layer 130, document management layer 150 and feedback and training layer 170 in the present embodiment are shown as part of the learning and adaptation platform 105, at least a portion of the user specific layout management layer 110, document theme analysis layer 130, document management layer 150 and/or feedback and training layer 170 in other embodiments may be implemented on one or more other processing platforms that are accessible to the learning and adaptation platform 105 over one or more networks. Such components can each be implemented at least in part within another system element or at least in part utilizing one or more stand-alone components coupled to the network 104.

The databases described herein are assumed to comprise one or more storage systems configured to store information relating to processing performed, data used, and to other functionality of the learning and adaptation platform 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of learning and adaptation platform 105 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It is assumed that the learning and adaptation platform 105 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the user specific layout management layer 110, document theme analysis layer 130, document management layer 150 and feedback and training layer 170, and the elements thereof can each be implemented in the form of one or more LXCs running on one or more VMs. Other arrangements of one or more processing devices of a processing platform can be used to implement the layers 110, 130, 150 and 170 as well as other components of the learning and adaptation platform 105. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the learning and adaptation platform 105 to reside in different data centers. Numerous other distributed implementations of the learning and adaptation platform 105 are possible.

Accordingly, one or each of the user specific layout management layer 110, document theme analysis layer 130, document management layer 150 and feedback and training layer 170 can each be implemented in a distributed manner so as to comprise a plurality of distributed components implemented on respective ones of the plurality of compute nodes of the learning and adaptation platform 105.

It is to be appreciated that these and other features of illustrative embodiments are presented by way of example only, and should not be construed as limiting in any way.

Accordingly, different numbers, types and arrangements of system components such as the user specific layout management layer 110, document theme analysis layer 130, document management layer 150 and feedback and training layer 170, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the learning and adaptation platform and machine learning services can be offered to cloud infrastructure customers or other users as part of FaaS and/or PaaS offerings.

The operation of the information processing system 100 will now be described in further detail with reference to the flow diagram of FIG. 8. The process 800 as shown includes steps 801 through 811, and is suitable for use in the system 100 but is more generally applicable to other types of information processing systems comprising learning and adaptation platform configured for dynamically modifying the presentation of information.

In step 801, a machine learning model corresponding to a plurality layouts for content based on a plurality of target user types is defined. In step 803, the content is processed to identify a theme of the content. In processing the content to identify the theme of the content, one or more elements from which the theme can be identified are extracted from the content. The one or more elements comprise at least one of an image, a table, a statement, a numeric combination, and an expressed sentiment. In processing the content to identify the theme of the content, one or more keywords and/or key phrases are identified in the content.

In step 805 at least one electronic document for the content is generated based on the theme of the content and at least one of the plurality layouts for the content. In step 807, a plurality of interactions of at least one user with the electronic document are analyzed. The plurality of interactions include at least one of one or more searches performed by the at least one user to retrieve the electronic document, and one or more steps taken by the at least one user to consume the content in the electronic document. In analyzing the plurality of interactions of at least one user with the at least one electronic document, one or more keywords or key phrases used by the at least one user in connection with the one or more searches, and an amount of time the at least one user spends on one or more portions of the electronic document are monitored and identified. Accessing by the at least one user to one or more parts of a table of contents of the electronic document is also monitored and identified.

In step 809, at least one pattern of the at least one user corresponding to at least one of the retrieval and the consumption of the content based on the analyzing is identified.

In step 811, the machine learning model is trained based on the at least one pattern by applying one or more machine learning algorithms to data from the plurality of interactions. The electronic document is dynamically modified based on the training. In training the machine learning model, the one or more keywords or key phrases used by the at least one user in connection with the one or more searches are dynamically mapped to the content being consumed in the electronic document.

A content optimizer validates one or more parameters being used in connection with the content. For example, the content optimizer comprises a format checker configured to analyze the content and identify different types of source files and output files in use in connection with the content. The format checker confirms whether the identified different types of source files and output files are available for a specific set of documents associated with the content.

The content optimizer also removes redundant and/or injected information from the content. The content optimizer further comprises a link engine configured to verify whether hyperlinks to different sources within or from the content are correct. The link engine generates customized hyperlinks across electronic documents based on the trained machine learning model and/or a thematic structure of a product associated with the content.

The process may further include defining a new target user type in addition to the plurality of target user types based on the training, and defining a new layout in addition to the plurality of layouts based on the new target user type.

Figure 8:
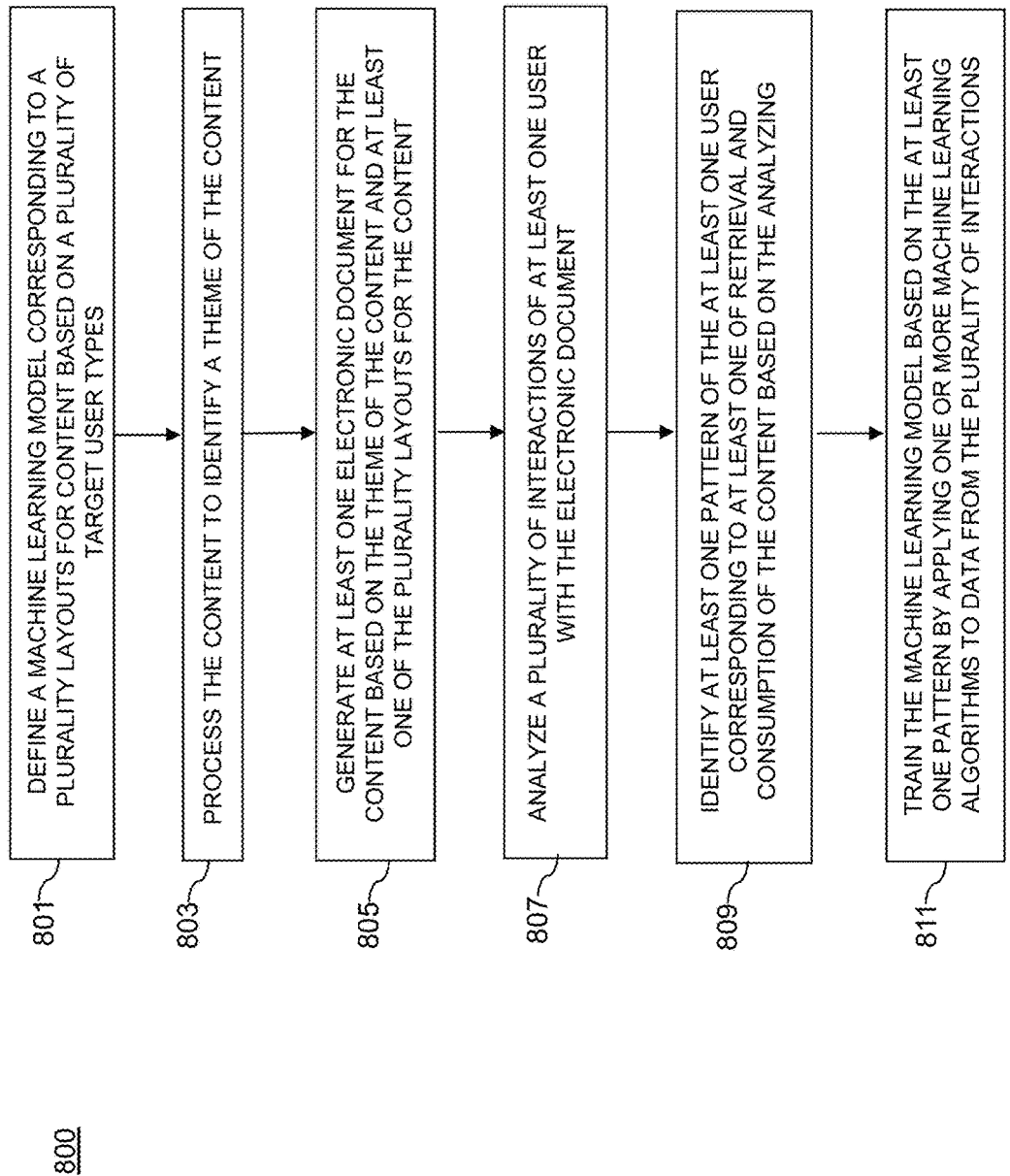
FIG. 8 is a flow diagram of a process for dynamically modifying the presentation of information based on user behavioral patterns in an illustrative embodiment.

It is to be appreciated that the FIG. 8 process and other features and functionality described above can be adapted for use with other types of information systems configured to execute learning and adaptation services on a learning and adaptation platform or other type of processing platform.

The particular processing operations and other system functionality described in conjunction with the flow diagram of FIG. 8 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a learning and adaptation platform as disclosed herein can provide a number of significant advantages relative to conventional arrangements. For example, embodiments of the present invention are configured to address problems with finding accurate content online which is relevant and easily accessible to the user searching for the content. Currently, there are no techniques or solutions which take account the type of audience seeking the content, and organize a presentation of the content for particular user types or personas.

Advantageously, the embodiments of the present invention utilize machine learning to provide an Information Understanding System (IUS) which is designed based on different learning patterns and has the capability to evolve with new sets of information. The system continuously learns and adapts to the behavior pattern of different users based on an analysis of user actions in connection with searching for and consuming electronic content.

Information responsive to internal (company owned domain search) and external (search engine) browsing needs to be validated to ensure that an organization is producing the right content. Advantageously, a content optimizer, including a format checker, noise drop component and link engine, ensures that accurate and timely information is always accessible by any search engine.

Embodiments of the present invention continuously can learn and re-learn users' behavior patterns over a period of time by analyzing information consumed during every interactive session against a business driven logical structure and product driven thematic structure. The segmentation of each information set that is being consumed is also analyzed.

In an aspect of the present invention, a guidance model between the data being consumed against the search key phrases is created, and segmentation of such data is further used to create dynamic maps based on usage patterns. In another advantage, the presentation of electronic documents, including document layout and TOCs, can be dynamically modified and updated to conform to the behavior patterns of different target audiences.

By identifying effective key phrases and/or key words used by particular groups of users, and organizing and presenting content based on the identified key phrases and/or key words, embodiments of the present invention advantageously ensure that content is accurate for the target users.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the learning and adaptation platform 105 or portions thereof are illustratively implemented for use by tenants of such a multi-tenant environment.

As mentioned previously, cloud infrastructure as disclosed herein can include cloud-based systems such as AWS, GCE and Microsoft Azure. Virtual machines provided in such systems can be used to implement at least portions of one or more of a computer system and a learning and adaptation platform in illustrative embodiments. These and other cloud-based systems in illustrative embodiments can include object stores such as AWS S3, GCE Cloud Storage, and Microsoft Azure Blob Storage.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
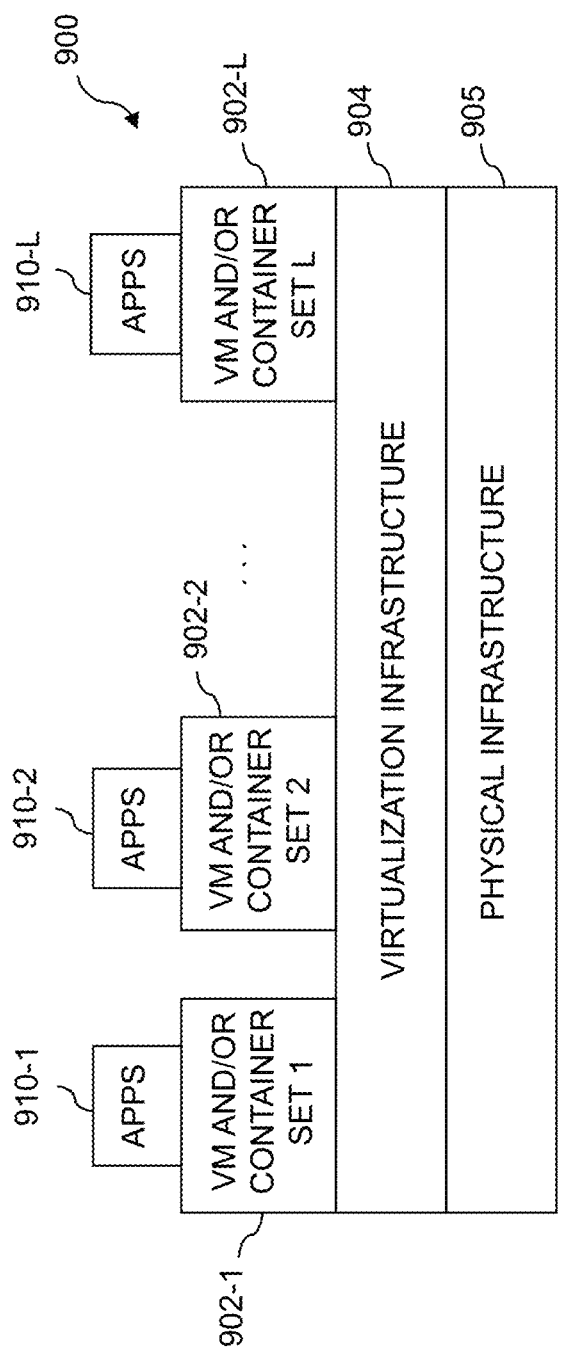
FIGS. 9 and 10 show examples of processing platforms that may be utilized to implement at least a portion of an information processing system in illustrative embodiments.
Figure 10:
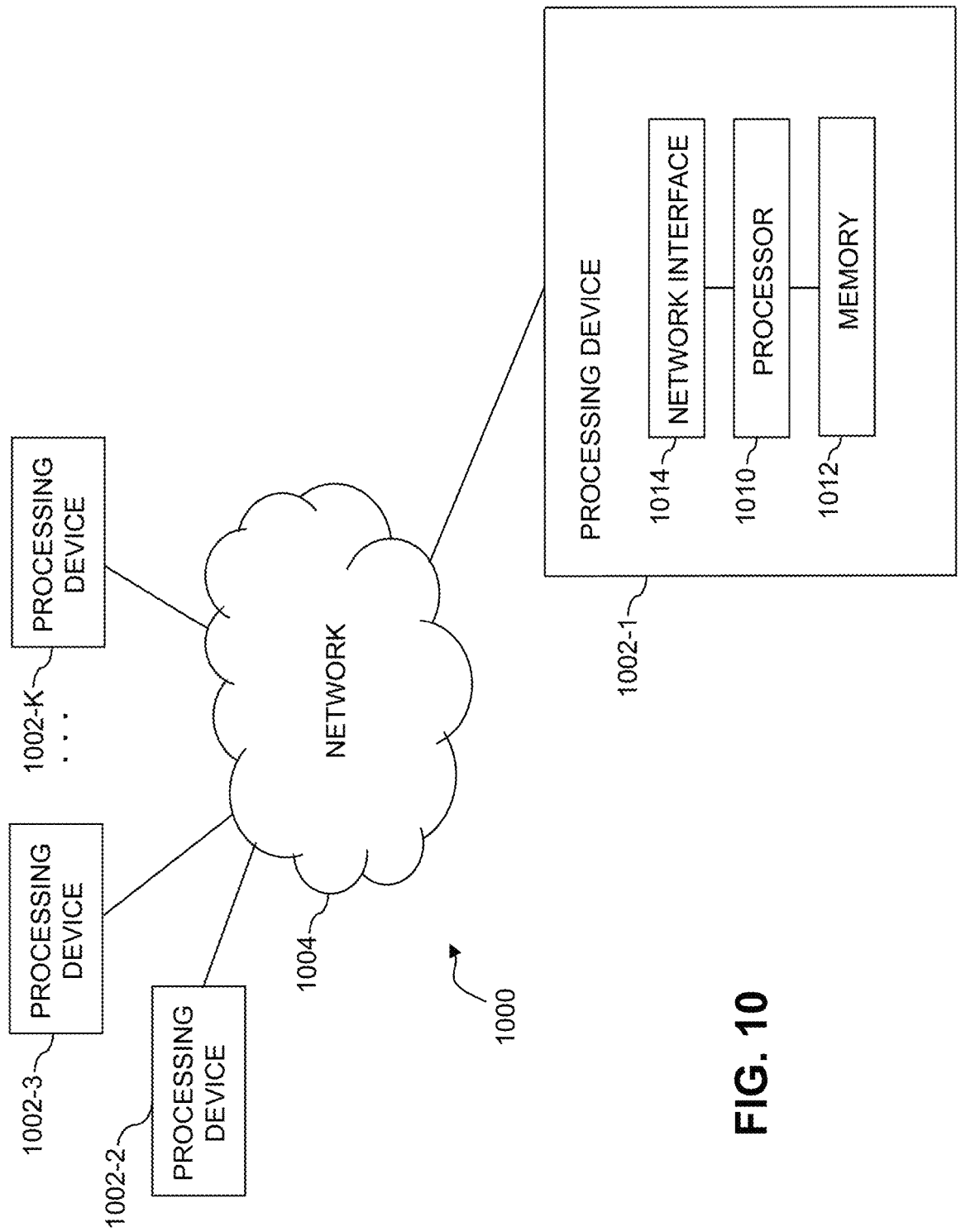

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide learning and adaptation functionality of the type described above for one or more processes running on a given one of the VMs. For example, each of the VMs can implement user specific layout management, document theme analysis, document management and/or feedback and training for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide learning and adaptation functionality of the type described above for one or more processes running on different ones of the containers. For example, a container host device supporting multiple containers of one or more container sets can implement one or more instances of user specific layout management, document theme analysis, document management and/or feedback and training.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012. The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the learning and adaptation platform 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and learning and adaptation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising a plurality of processing devices comprising one or more processors coupled to one or more memories;
   said at least one processing platform being configured to:
   define a machine learning model corresponding to a plurality of layouts for content based on a plurality of target user types;
   process the content to identify a theme of the content;
   generate at least one electronic document for the content based on the theme of the content and at least one of the plurality layouts for the content;
   analyze a plurality of interactions of at least one user with the electronic document, wherein the plurality of interactions include at least one of one or more searches performed by the at least one user to retrieve the electronic document, and one or more steps taken by the at least one user to consume the content in the electronic document;
   identify at least one pattern of the at least one user corresponding to at least one of the retrieval and the consumption of the content based on the analyzing;
   train the machine learning model based on the at least one pattern by applying one or more machine learning algorithms to data from the plurality of interactions; and
   dynamically modify the electronic document based on the training;
   wherein in dynamically modifying the electronic document, said at least one processing platform is configured to modify a table of contents of the electronic document based on a determination of whether or not the table of contents enables the at least one user to navigate to the content;
   wherein, in defining the machine learning model, said at least one processing platform is configured to:
   periodically generate a guidance model for the content based on data being consumed by a plurality of users against a plurality of search key phrases and a plurality of search keywords used by the plurality of users; and
   measure performance of the periodically generated guidance model against a secondary guidance model including a plurality of rules for the plurality of the layouts, wherein the plurality of the rules correspond to respective ones of the plurality of target user types;
   wherein in analyzing the plurality of interactions of the at least one user with the electronic document, said at least one processing platform is configured to:
   monitor and identify accessing by the at least one user of one or more parts of the table of contents; and record an electronic path followed by the at least one user after accessing the one or more parts of the table of contents; and wherein the training of the machine learning model and the modifying of the table of contents are based at least in part on the recorded electronic path.

2. The apparatus of claim 1 wherein said at least one processing platform is further configured to implement a content optimizer, wherein the content optimizer validates one or more parameters being used in connection with the content.

3. The apparatus of claim 2 wherein the content optimizer comprises a format checker configured to analyze the content and identify different types of source files and output files in use in connection with the content.

4. The apparatus of claim 3 wherein the format checker is further configured to confirm whether the identified different types of source files and output files are available for a specific set of documents associated with the content.

5. The apparatus of claim 2 wherein content optimizer removes at least one of redundant and injected information from the content.

6. The apparatus of claim 2 wherein the content optimizer comprises a link engine configured to verify whether hyperlinks to different sources within or from the content are correct.

7. The apparatus of claim 2 wherein the content optimizer comprises a link engine configured to generate customized hyperlinks across electronic documents based on at least one of the trained machine learning model and a thematic structure of a product associated with the content.

8. The apparatus of claim 1 wherein in processing the content to identify the theme of the content, said at least one processing platform is configured to extract from the content one or more elements from which the theme can be identified.

9. The apparatus of claim 8 wherein the one or more elements comprise at least one of an image, a table, a statement, a numeric combination, and an expressed sentiment.

10. The apparatus of claim 1 wherein in processing the content to identify the theme of the content, said at least one processing platform is configured to identify at least one of one or more keywords and one or more key phrases in the content.

11. The apparatus of claim 1 wherein in analyzing the plurality of interactions of the at least one user with the electronic document, said at least one processing platform is further configured to monitor and identify one or more keywords or key phrases used by the at least one user in connection with the one or more searches.

12. The apparatus of claim 11 wherein in training the machine learning model, said at least one processing platform is configured to dynamically map the one or more keywords or key phrases used by the at least one user to the content in the electronic document being consumed by the at least one user.

13. The apparatus of claim 1 wherein in analyzing the plurality of interactions of at least one user with the electronic document, said at least one processing platform is further configured to monitor and identify an amount of time the at least one user spends on one or more portions of the electronic document.

14. The apparatus of claim 1 wherein said at least one processing platform is further configured to define a new target user type in addition to the plurality of target user types based on the training.

15. The apparatus of claim 14 wherein said at least one processing platform is further configured to define a new layout in addition to the plurality of layouts based on the new target user type.

16. A method comprising:
defining a machine learning model corresponding to a plurality of layouts for content based on a plurality of target user types;
processing the content to identify a theme of the content;
generating at least one electronic document for the content based on the theme of the content and at least one of the plurality layouts for the content;
analyzing a plurality of interactions of at least one user with the electronic document, wherein the plurality of interactions include at least one of one or more searches performed by the at least one user to retrieve the electronic document, and one or more steps taken by the at least one user to consume the content in the electronic document;
identifying at least one pattern of the at least one user corresponding to at least one of the retrieval and the consumption of the content based on the analyzing;
training the machine learning model based on the at least one pattern by applying one or more machine learning algorithms to data from the plurality of interactions; and
dynamically modifying the electronic document based on the training;
wherein the dynamically modifying of the electronic document comprises modifying a table of contents of the electronic document based on a determination of whether or not the table of contents enables the at least one user to navigate to the content;
wherein the defining of the machine learning model comprises:
periodically generating a guidance model for the content based on data being consumed by a plurality of users against a plurality of search key phrases and search keywords used by the plurality of users; and
measuring performance of the periodically generated guidance model against a secondary guidance model including a plurality of rules for the plurality of the layouts, wherein the plurality of the rules correspond to respective ones of the plurality of target user types;
wherein the analyzing of the plurality of interactions of the at least one user with the electronic document comprises:
monitoring and identifying accessing by the at least one user of one or more parts of the table of contents; and
recording an electronic path followed by the at least one user after accessing the one or more parts of the table of contents;
wherein the training of the machine learning model and the modifying of the table of contents are based at least in part on the recorded electronic path; and
wherein the method is performed by at least one processing platform comprising at least one processing device comprising a processor coupled to a memory.

17. The method of claim 16 further comprising implementing a content optimizer, wherein the content optimizer validates one or more parameters being used in connection with the content.

18. A computer program product comprising a non-transitory processor-readable storage medium having stored therein program code of one or more software programs, wherein the program code when executed by at least one processing platform causes said at least one processing platform to:
- define a machine learning model corresponding to a plurality of layouts for content based on a plurality of target user types;
- process the content to identify a theme of the content;
- generate at least one electronic document for the content based on the theme of the content and at least one of the plurality layouts for the content;
- analyze a plurality of interactions of at least one user with the electronic document, wherein the plurality of interactions include at least one of one or more searches performed by the at least one user to retrieve the electronic document, and one or more steps taken by the at least one user to consume the content in the electronic document;
- identify at least one pattern of the at least one user corresponding to at least one of the retrieval and the consumption of the content based on the analyzing; and
- train the machine learning model based on the at least one pattern by applying one or more machine learning algorithms to data from the plurality of interactions; and
- dynamically modify the electronic document based on the training;
- wherein in dynamically modifying the electronic document, the program code when executed by said at least one processing platform causes said at least one processing platform to modify a table of contents of the electronic document based on a determination of whether or not the table of contents enables the at least one user to navigate to the content;
- wherein in defining the machine learning model, the program code when executed by said at least one processing platform causes said at least one processing platform to:
- periodically generate a guidance model for the content based on data being consumed by a plurality of users against a plurality of search key phrases and search keywords used by the plurality of users; and
- measure performance of the periodically generated guidance model against a secondary guidance model including a plurality of rules for the plurality of the layouts, wherein the plurality of the rules correspond to respective ones of the plurality of target user types;
- wherein in analyzing the plurality of interactions of the at least one user with the electronic document, the program code when executed by said at least one processing platform causes said at least one processing platform to:
- monitor and identify accessing by the at least one user of one or more parts of the table of contents; and
- record an electronic path followed by the at least one user after accessing the one or more parts of the table of contents; and
- wherein the training of the machine learning model and the modifying of the table of contents are based at least in part on the recorded electronic path.

19. The computer program product of claim 18 wherein the program code when executed by said at least one processing platform further causes said at least one processing platform to implement a content optimizer, wherein the content optimizer validates one or more parameters being used in connection with the content.

20. The computer program product of claim 19 wherein the content optimizer comprises a format checker configured to analyze the content and identify different types of source files and output files in use in connection with the content.

* * * * *